United States Patent
Myers et al.

(10) Patent No.: US 9,313,429 B1
(45) Date of Patent: Apr. 12, 2016

(54) REDUCING ROLL-INDUCED SMEAR IN IMAGERY

(71) Applicant: Lockheed Martin Corporation, Bethesda, MD (US)

(72) Inventors: Mark T. Myers, Orlando, FL (US); Trisha Fish, Merritt Island, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 26 days.

(21) Appl. No.: 14/263,145

(22) Filed: Apr. 28, 2014

Related U.S. Application Data

(60) Provisional application No. 61/817,182, filed on Apr. 29, 2013.

(51) Int. Cl.
*H04N 5/225* (2006.01)
*H04N 3/14* (2006.01)
*H04N 5/359* (2011.01)
*H04N 5/232* (2006.01)

(52) U.S. Cl.
CPC ......... *H04N 5/3595* (2013.01); *H04N 5/23238* (2013.01)

(58) Field of Classification Search
CPC ..... H04N 5/349; H04N 5/341; H04N 3/1568; H04N 5/359; H04N 5/2175; H04N 3/1581
USPC ............................ 348/218.1, 219.1, 248, 294
See application file for complete search history.

(56) References Cited

U.S. PATENT DOCUMENTS

| | | | |
|---|---|---|---|
| 8,463,078 B2 | 6/2013 | Goodnough et al. | |
| 8,937,639 B2 * | 1/2015 | Kasunic et al. | 348/36 |
| 2006/0181483 A1 | 8/2006 | Ari | |
| 2007/0058717 A1 * | 3/2007 | Chosak et al. | 375/240.08 |
| 2007/0222981 A1 | 9/2007 | Ponsardin et al. | |
| 2010/0046853 A1 | 2/2010 | Goodnough et al. | |
| 2015/0215536 A1 | 7/2015 | Buell et al. | |

OTHER PUBLICATIONS

Author Unknown, "Digital Focal-Plane Arrays," Tech Notes, MIT Lincoln Laboratory, 2010, retrieved from http://www.11.mit.edu/publications/technotes/TechNote_DFPA.pdf, 2 pages.
Author Unknown, "Staring array," Wikipedia, version modified Jan. 28, 2013, retrieved from http://en.wikipedia.org/w/index.php?title=Staring_array&oldid=535312116, 2 pages.

(Continued)

*Primary Examiner* — Sinh Tran
*Assistant Examiner* — Selam Gebriel
(74) *Attorney, Agent, or Firm* — Withrow & Terranova, PLLC

(57) ABSTRACT

Mechanisms for reducing roll-induced smear are provided. For each frame period of a plurality of frame periods of a detector array, a pixel mask is rotated with respect to the detector array based on a rotational movement of the scene with respect to the detector array to identify a subset of pixels of the detector array. The pixels in the subset of pixels integrate energy from a scene during that respective frame period. The pixels in the subset of pixels are readout during the respective frame period to generate a pixel data set. The subset of pixels is less than all the pixels in the detector array. An image portion of the scene is generated based on the pixel data set. Successive image portions can be combined to form an image of the scene.

11 Claims, 8 Drawing Sheets

(56) References Cited

OTHER PUBLICATIONS

Brown, Matthew G. et al., "Digital-pixel Focal Plane Array Development," Quantum Sensing and Nanophotonic Devices VII, Proceedings of SPIE, vol. 7608, 2010, SPIE, 10 pages.

Christensen, Philip R. et al., "The Thermal Emission Imaging System (THEMIS) for the Mars 2001 Odyssey Mission," Space Science Reviews, vol. 110, 2004, Kluwer Academic Publishers, pp. 85-130.

Kelly, Michael W. et al., "Advances in Detectors: Digital-pixel FPAs enhance infrared imaging capabilities," LaserFocusWorld, vol. 49, Issue 1, Jan. 1, 2013, PennWell Corporation, 7 pages.

Tyrrell, Brian et al., "Time Delay Integration and In-Pixel Spatiotemporal Filtering Using a Nanoscale Digital CMOS Focal Plane Readout," IEEE Transactions on Electron Devices, vol. 56, No. 11, Nov. 2009, IEEE, pp. 2516-2523.

Non-Final Office Action for U.S. Appl. No. 14/471,656, mailed Jan. 8, 2016, 15 pages.

* cited by examiner

REDUCING ROLL-INDUCED SMEAR IN IMAGERY

RELATED APPLICATIONS

This application claims the benefit of U.S. Provisional Patent Application No. 61/817,182, filed on Apr. 29, 2013, entitled "IMAGE SMEAR CORRECTION DEVICE," the disclosure of which is hereby incorporated herein by reference in its entirety.

TECHNICAL FIELD

The embodiments relate to reducing roll-induced smear in imagery and, in particular, to selecting subsets of pixels of a detector array for readout based on the rotation of a scene with respect to the detector array.

BACKGROUND

Gimbaled imaging systems are commonly used to image large areas. Such imaging systems may be utilized on a stationary platform on the ground, a moving platform on the ground, or by aircraft. Gimbaled imaging systems facilitate the relatively rapid generation of wide area imagery, but typically induce roll or rotation smear of the scene with respect to the detector array that is detecting the scene. Image smear and roll artifacts can be corrected via opto-mechanical mechanisms in the optical system. However, such mechanisms add weight and cost, decrease reliability, and increase the overall size of the optical system. Electronic processing may also be used to correct such artifacts, but require higher data rate and processing requirements.

SUMMARY

The embodiments reduce or eliminate smear that may result from roll, or rotation, of a scene with respect to a detector array, and substantially reduce an amount of data readout from the detector array, reducing bandwidth and processing requirements. Gimbaled systems commonly cause roll-induced smear, but the embodiments are not limited to gimbaled systems, and have applicability in any context wherein roll may cause image smearing.

In one embodiment a method is provided. For each frame period of a plurality of frame periods of a detector array comprising a plurality of pixels, a pixel mask is rotated with respect to the detector array based on a rotational movement of a scene with respect to the detector array to identify a subset of pixels of the detector array. The pixels in the subset of pixels integrate energy from the scene during that respective frame period. The pixels in the subset of pixels are readout during the respective frame period to generate a pixel data set. The subset of pixels is less than all the pixels in the detector array. An image portion of the scene is generated based on the pixel data set. Successive image portions can be combined to form an image of the scene. The rotation of the pixel mask with respect to the detector array based on the rotation of the scene with respect to the detector array greatly reduces, or eliminates, smear caused by roll, eliminating the need for relatively large opto-electrical systems, and extensive processing of the pixel data. The size and shape of the pixel mask may be determined based on criteria such as a desired sensitivity, a desired resolution, a desired data rate, and the like. Larger pixel masks may provide higher resolution and greater sensitivity, but require larger data bandwidth, while smaller pixel masks may facilitate relatively low data bandwidth, but with a drop in sensitivity.

In one embodiment, combining the successive image portions to form the image of the scene comprises placing successive image portions side by side to form the image of the scene.

In another embodiment, the pixel mask has a dimension such that energy emitted from a same portion of the scene is integrated by different pixels in successive subsets of pixels over successive frame periods. Combining the successive image portions to form the image of the scene includes integrating the successive image portions such that common image portions of the scene captured in the successive image portions are combined with one another.

In one embodiment, the pixel mask comprises a conical shape, such that the pixel mask has a narrow first end portion and a wide second end portion.

In another embodiment, during a first integration period of a first frame period of a detector array comprising a plurality of pixels, an integration of energy by the plurality of pixels from a first portion of a scene that is moving rotationally with respect to the detector array is initiated. Based on a blur threshold, integration of the energy by subsets of pixels of the plurality of pixels is successively halted during the first integration period. At an end of the first integration period, the plurality of pixels is read out to generate a pixel data set. An image of the first portion of the scene based on the pixel data set is generated. The detector array is stepped to a new portion of the scene that is different from the first portion of the scene. During a second integration period of a next frame period of the detector array, integration of energy by the plurality of pixels from the new portion of the scene that is moving rotationally with respect to the detector array is initiated. Based on the blur threshold, integration of the energy by subsets of pixels of the plurality of pixels during the second integration period is successively halted. At an end of the second integration period, the plurality of pixels is read out to generate a new pixel data set.

In another embodiment, a method for processing an image is provided. An image is detected having a number of pixels. Smear within a group of pixels is detected in the image. The image is corrected by de-selecting pixels that have smeared beyond a predetermined motion value of the detected image being sampled.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first pixel" and "second pixel," and does not imply a priority, a type, an importance, or other attribute, unless otherwise stated herein.

The embodiments reduce or eliminate smear that may result from roll, or rotation, of a scene with respect to a detector array, and substantially reduce an amount of data readout from the detector array, reducing bandwidth requirements of data flow between the detector array and downstream processing elements. Gimbaled systems commonly cause roll-induced smear, but the embodiments are not limited to gimbaled systems, and have applicability in any context wherein roll may cause image smearing. The embodiments also reduce or eliminate de-roll processing.

Figure 1:
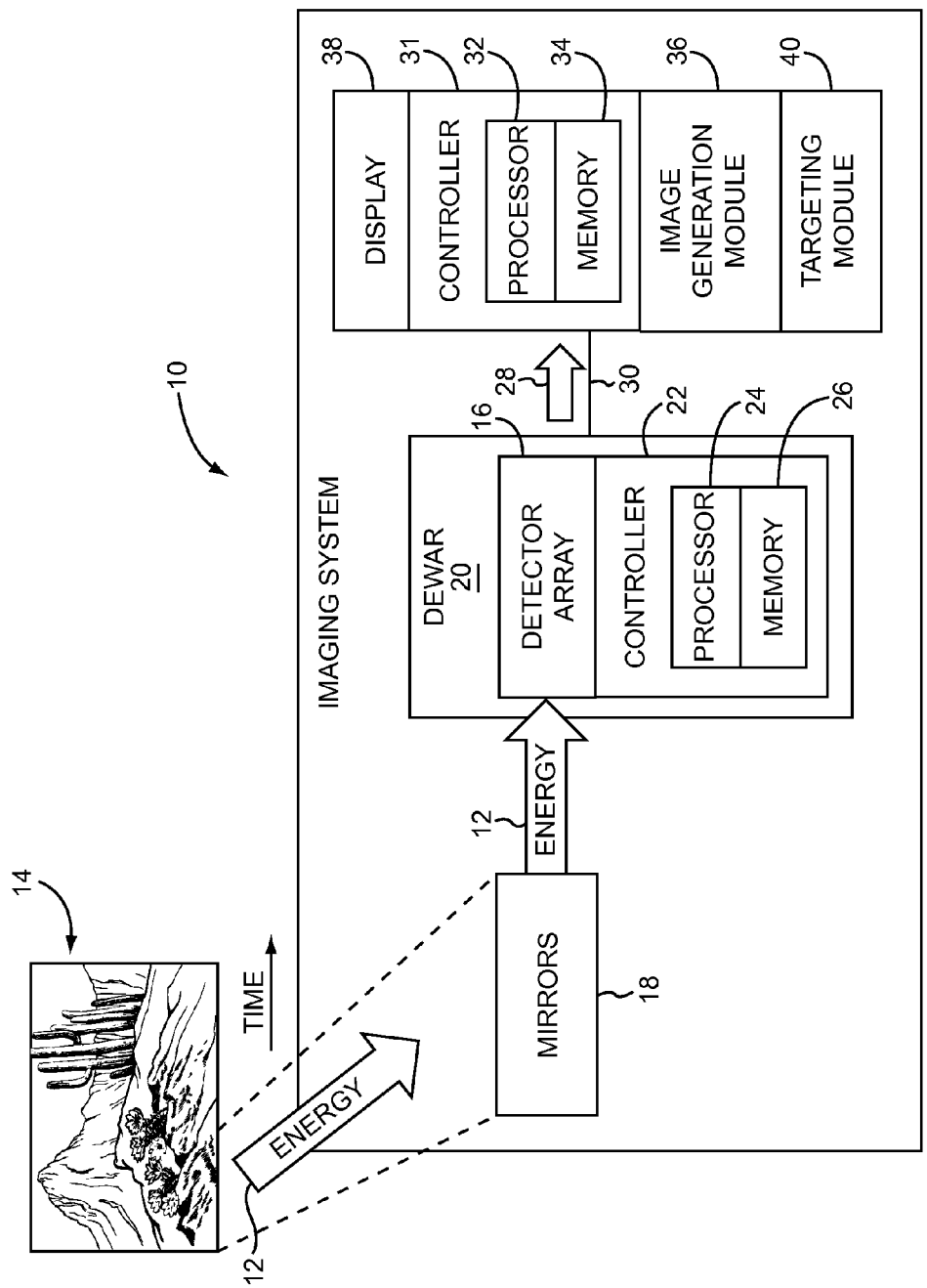
FIG. 1 is a block diagram of an imaging system in which embodiments may be practiced.

FIG. 1 is a block diagram of an imaging system 10 in which embodiments may be practiced. Energy 12, in the form of photons, of a scene 14 is scanned across a detector array 16 over a period of time by one or more mirrors 18 maintained in a gimbal that is continuously moving with respect to the scene 14. In other embodiments, the detector array 16 itself may be scanned across the scene 14 by a gimbal. In either embodiment, the use of a gimbal causes the energy 12 of the scene 14 to rotate, sometimes referred to as roll, with respect to the detector array 16. Thus, the scene 14 not only has translational movement with respect to the detector array 16, but also has rotational movement with respect to the detector array 16.

The scene 14 may encompass a 360-degree field of regard of the imaging system 10, and be continuously and repeatedly scanned by the imaging system 10. The imaging system 10 may be mounted, by way of non-limiting example, on a stationary platform, a ground vehicle that moves about, or an aircraft.

The detector array 16, as discussed in greater detail herein, comprises a two-dimensional array of photodiodes, referred to herein as pixels, that are sensitive to a desired range of wavelengths, such as mid-wave infrared wavelengths, long-wave infrared wavelengths, short-wave infrared wavelengths, visible wavelengths, or the like. The detector array 16 may comprise, for example, a complementary metal-oxide semiconductor (CMOS) detector array, a charge-coupled device (CCD) detector array, a focal plane array (FPA), or any other suitable detector array. The number of pixels in the detector array 16 defines a resolution of the detector array 16, and may comprise any desired resolution, such as 256 columns of pixels by 256 rows of pixels, 1024 columns of pixels by 1024 rows of pixels, or the like. As the resolution increases, however, the amount of data generated by the detector array 16 increases which leads to greater processing requirements.

The pixels collect the energy 12, convert the energy 12 into electrical charge, and output either an accumulated electrical charge, or a numeric value, referred to herein collectively as a photon quantifier, that quantifies the amount of energy 12 collected over a period of time. The detector array 16 is operated at a desired, or designed, frame rate, such that some or all of the photon quantifiers, as discussed in greater detail herein, are iteratively readout of the detector array 16 at a periodic rate referred to herein as a frame period. The period of time during which photons are collected by the detector array 16 is referred to herein as an integration period, and is a smaller portion of time than the duration of the frame period.

The imaging system 10 may be designed such that translational movement is accounted for in the detector array 16 and does not result in substantial smear or blurring, such as by operating in a time delay and integration mode, wherein the photon quantifiers cascade along columns of pixels at the rate at which the scene 14 moves with respect to the detector array 16. In other embodiments, the detector array 16 may operate in a step-stare mode, wherein the scene 14 iteratively steps with respect to the detector array 16 at the frame rate, and translational movement briefly stops with respect to the detector array 16 during the integration period of the respective frame period.

However, rotational movement of the scene 14 with respect to the detector array 16, which can occur, for example, when the mirrors 18 or detector array 16 are coupled to a gimbal, may cause smearing of the energy 12 across some of the pixels in the detector array 16, based on any of a number of factors, such as the rate of rotation of the scene 14 with respect to the detector array 16, the integration period of the detector array 16, and the like.

To reduce noise and increase sensitivity, the detector array 16 may be maintained in a dewar 20 that establishes a vacuum. The dewar 20 may also include a cooler (not illustrated) that keeps the detector array 16 at relatively low temperatures. The detector array 16 may be controlled by a controller 22 that may, in some embodiments, implement portions of the embodiments discussed herein. The controller 22 may include a processor 24 and a memory 26 in which software instructions may be stored that, when executed by the processor 24, implement some or all of the functionality described herein. In many embodiments, it is desirable to keep the size of the imaging system 10 as small as possible, making electro-optical mechanisms that reduce rotational smear undesirable.

Each frame period, the detector array 16 may send data, referred to herein as a pixel data set 28, that identify the photon quantifiers readout from the detector array 16 during the respective frame period. The pixel data sets 28 may then be transmitted out of the dewar 20 via a communication link 30 to one or more downstream elements, such as a controller 31, for subsequent processing. The controller 31 may include a processor 32 and a memory 34 that implements some or all of the functionality described herein. An image generation module 36 may combine the pixel data sets 28 to generate imagery that can be presented on a display 38 for viewing, for example, by a pilot or other user. In addition, or alternatively, the imagery may be provided to a targeting module 40 for identification of potential targets in the scene 14.

The image generation module 36 and targeting module 40 may comprise hardware, software, or a combination thereof. In some embodiments, the image generation module 36 and/or targeting module 40 may comprise software instructions maintained in the memory 34 and which configure the processor 32 to implement some or all of the functionality described herein.

In the absence of some of the embodiments disclosed herein, based on the resolution and frame rate, the detector array 16 may generate a substantial amount of data. The greater the amount of data generated by the detector array 16, the larger the processing requirements are, increasing cost, size, and complexity of the imaging system 10. Large amounts of data may also require substantially more time to post-process, effectively limiting the rate of scan of the scene 14 with respect to the detector array 16. In some contexts, such as in a military context, it is desirable to have relatively high scan rates, such as scanning a complete 360-degree field of regard every two to three seconds.

Figure 2:
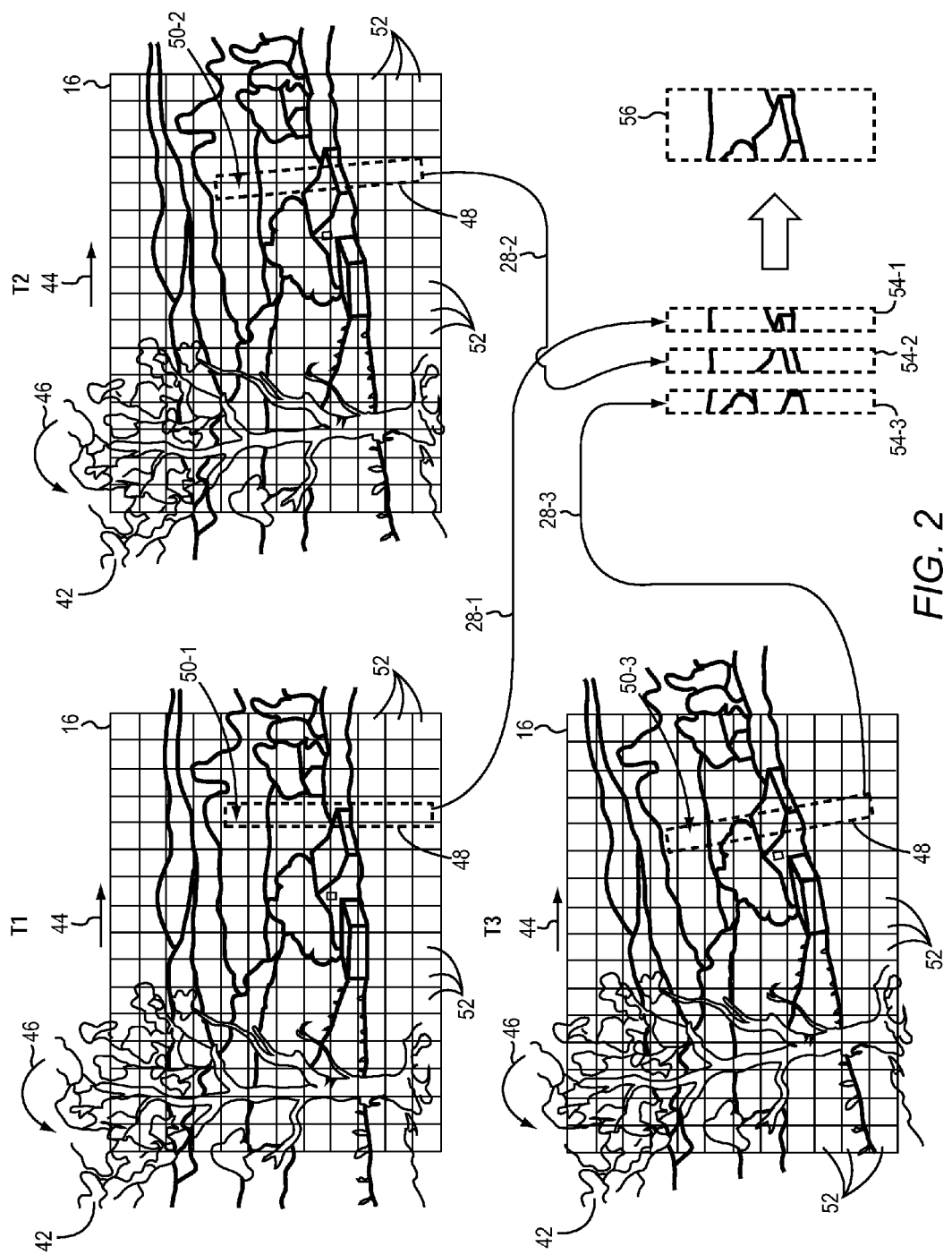
FIG. 2 is a block diagram of a scene at three successive frame periods according to one embodiment.

FIG. 2 is a block diagram of a scene 42 at three successive frame periods T1, T2 and T3 according to one embodiment. During each frame period T1, T2, T3, the scene 42 is moving translationally, in a direction 44, with respect to the detector array 16, and rotationally, in a counter-clockwise direction 46, with respect to the detector array 16. Referring first to the frame period T1, a pixel mask 48 is used to select a subset 50-1 of pixels 52 of the detector array 16. Pixel masks, as discussed herein, may be generated by the controller 31, outside the dewar 20, or by the controller 22, inside the dewar 20, based on a desired implementation. The frame period T1 covers one frame period, and the subset 50-1 of pixels 52 integrates energy 12 from the scene 42 during an integration period of the frame period T1. If the detector array 16 is capable of implementing selective pixel integration, only those pixels 52 in the subset 50-1 may be turned on and integrate energy 12 from the scene 42 during the integration period. Alternatively, all the pixels 52 may be integrating energy 12 from the scene 42 during the integration period. At the end of the integration period, the subset 50-1 of pixels 52 is readout as a pixel data set 28-1 from the detector array 16. In some embodiments, where the detector array 16 is capable of individual pixel 52 readout, only those pixels 52 in the subset 50-1 are readout. In other embodiments, wherein the detector array 16 is capable of less granular pixel 52 readout, the smallest set of pixels 52 that include the subset 50-1 are readout. For example, if the detector array 16 is capable of reading out pixels 52 in 4 by 4 groups, the smallest set of 4 by 4 groups of pixels 52 that include the subset 50-1 are readout. An image portion 54-1 may then be generated based on the pixel data set 28-1. The image portion 54-1 comprises a relatively small slice of the scene 42 captured by the pixels 52 in the subset 50-1.

Referring now to the frame period T2, the pixel mask 48 is rotated in the counter-clockwise direction 46 with respect to the detector array 16 based on an angular rotation rate of the scene 42 with respect to the detector array 16. The pixel mask 48 identifies a new subset 50-2 of pixels 52. The new subset 50-2 of pixels 52 is a different subset of pixels 52 than the subset 50-1 due to the rotation of the pixel mask 48 with respect to the detector array 16. The subset 50-2 of pixels 52 integrates energy 12 from the scene 42 during an integration period of the frame period T2. At the end of the integration period, the subset 50-2 of pixels 52 is readout as a pixel data set 28-2 from the detector array 16. An image portion 54-2 may then be generated based on the pixel data set 28-2. The image portion 54-2 comprises a relatively small slice of the scene 42 captured by the pixels 52 in the subset 50-2.

Referring now to the frame period T3, the pixel mask 48 is rotated in the counter-clockwise direction 46 with respect to the detector array 16 based on the rotation rate of the scene 42 with respect to the detector array 16. The pixel mask 48 identifies a new subset 50-3 of pixels 52. The new subset 50-3 of pixels 52 is a different subset of pixels 52 than the subsets 50-1, 50-2 due to the rotation of the pixel mask 48 with respect to the detector array 16. The subset 50-3 of pixels 52 integrates energy 12 from the scene 42 during an integration period of the frame period T3. At the end of the integration period, the subset 50-3 of pixels 52 is readout as a pixel data set 28-3 from the detector array 16. An image portion 54-3 may then be generated based on the pixel data set 28-3. The image portion 54-3 comprises a relatively small slice of the scene 42 captured by the pixels 52 in the subset 50-3.

The image portions 54-1-54-3 may be combined to form imagery 56 of the scene 42. The process described with respect to frame periods T1-T3 may be repeated continuously, such that the imagery 56 is continually generated and provided, for example, to the display 38 (FIG. 1) and/or targeting module 40 (FIG. 1). The scanning of the scene 42 with respect to the detector array 16 may occur at a relatively high rate, such as 360 degrees every two seconds, for example. The imagery 56 may thus be continually updated and refreshed every two seconds.

In this embodiment, each subset 50 of pixels 52 captures an adjacent portion of the scene 42, and thus, the image portions 54-1-54-3 may be combined by concatenating, side by side, each successive new image portion 54 to a previous image portion 54.

The size and shape of the pixel mask 48 may be determined based on the rate of translational movement of the scene 42 with respect to the detector array 16, the length of the integration period, and any other desired criteria to eliminate smear of the energy 12. In this embodiment, the width of the pixel mask 48 may be uniform, and may be a width of a single column of pixels 52, or may be a width of multiple columns of pixels 52, depending on a rate of translational movement of the scene 42 with respect to the detector array 16.

Translational movement may be determined in accordance with the following formula:

$$= \frac{\text{Scan Rate} \left(\frac{\text{deg}}{\text{sec}}\right)}{\text{Frame Rate (Hz)}} * \left(\frac{\pi}{180}\right) * \frac{\text{Optics Focal Length}}{\text{Pixel Size}}$$

wherein scan rate is the rate of translational movement, in degrees per second, of the scene 42 with respect to the detector array 16, wherein frame rate is the number of frames per second, wherein the optics focal length is the focal length of the optical system, and wherein pixel size is the width of a pixel 52. The rate of rotation of the pixel mask 48 with respect to the detector array 16 may be determined based on a predetermined rate of rotation of the scene 42 with respect to the detector array 16 given the particular imaging system 10.

In this embodiment, because each pixel data set 28 contains a different portion of the scene 42, the sensitivity of the image portions 54 is relatively low, and the bandwidth from the dewar 20 to the image generation module 36 is corresponding low, allowing for relatively high scan rates. Moreover, because the pixel mask 48 rotates in conjunction with the scene 42, no de-roll processing is needed when combining the image portions 54 to form the imagery 56. Smearing may be greatly reduced or substantially eliminated by matching the width of the pixel mask 48 to the integration period.

Figure 3:
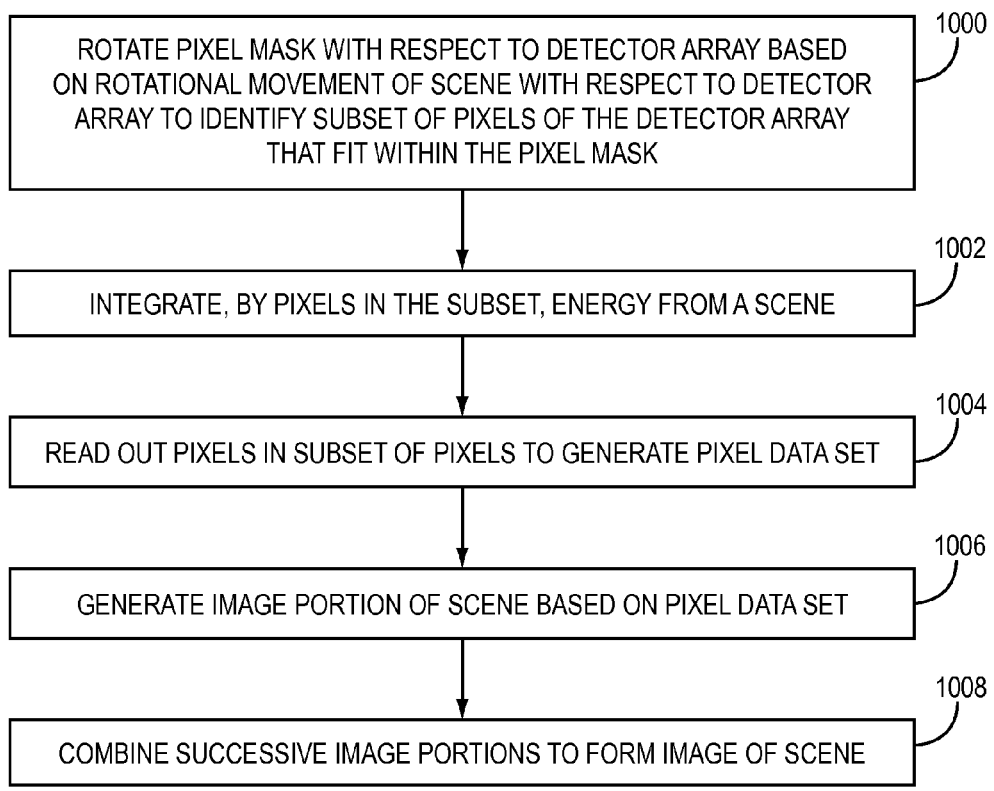
FIG. 3 is a flowchart of a method according to one embodiment.

FIG. 3 is a flowchart of a method according to one embodiment, and will be discussed in conjunction with FIG. 2. Referring to frame period T2 of FIG. 2, the pixel mask 48 is rotated with respect to the detector array 16 based on the rotational movement of the scene 42 with respect to the detector array 16 to identify the subset 50-2 of pixels 52 of the detector array 16 that fit within the pixel mask 48 (FIG. 3, block 1000). The pixels 52 of the subset 50-2 integrate energy 12 from the scene 42 (FIG. 3, block 1002). After the integration period, the pixels 52 in the subset 50-2 are readout to generate the pixel data set 28-2 (FIG. 3, block 1004). The image portion 54-2 is generated based on the pixel data set 28-2 (FIG. 3, block 1006). Successive image portions 54 are then combined to form the imagery 56 of the scene 42 (FIG. 3, block 1008).

Figure 4:
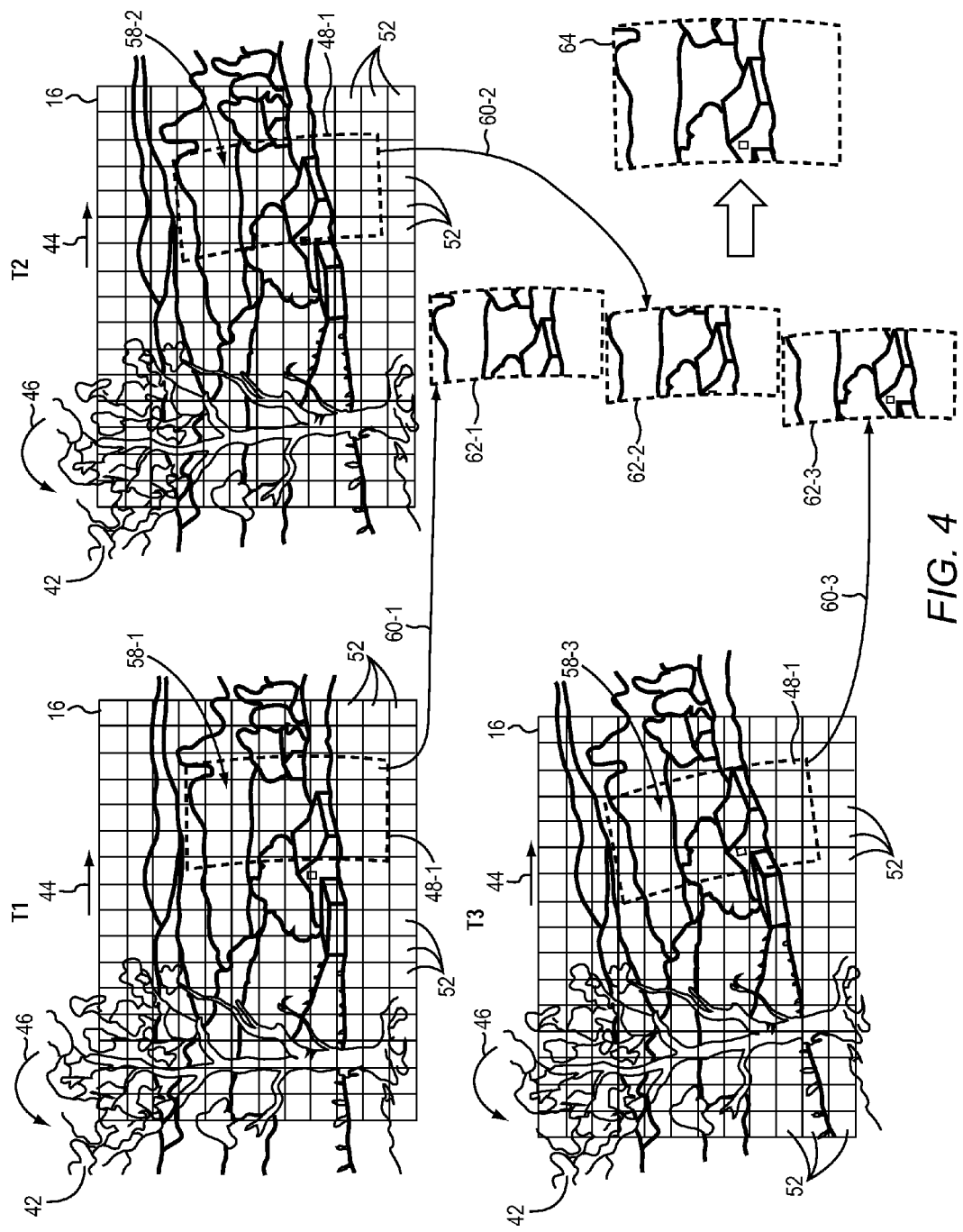
FIG. 4 is a block diagram of the scene at three successive frame periods according to another embodiment.

FIG. 4 is a block diagram of the scene 42 at three successive frame periods T1, T2, and T3 according to another embodiment. In this embodiment, a pixel mask 48-1 is sized such that energy 12 emitted from the same portion of the scene 42 is successively integrated by multiple subsets of pixels over a plurality of frame periods. As discussed above with regard to FIG. 2, during each frame period T1, T2, T3, the scene 42 is moving translationally, in the direction 44, with respect to the detector array 16, and rotationally, in the counter-clockwise direction 46, with respect to the detector array 16.

Referring first to the frame period T1, the pixel mask 48-1 is used to select a subset 58-1 of pixels 52 of the detector array 16. The frame period T1 covers one frame period, and the subset 58-1 of pixels 52 integrates energy 12 from the scene 42 during an integration period of the frame period T1. Again, if the detector array 16 is capable of implementing selective pixel integration, only those pixels 52 in the subset 58-1 may be turned on and integrate energy 12 from the scene 42 during the integration period. Alternatively, all the pixels 52 may be integrating energy 12 from the scene 42 during the integration period.

At the end of the integration period, the subset 58-1 of pixels 52 is readout as a pixel data set 60-1 from the detector array 16. In some embodiments, where the detector array 16 is capable of individual pixel 52 readout, only those pixels 52 in the subset 58-1 are readout. In other embodiments, wherein the detector array 16 is capable of less granular pixel readout, the smallest set of pixels 52 that include the subset 58-1 are readout. An image portion 62-1 may then be generated based on the pixel data set 60-1. The image portion 62-1 comprises a relatively small slice of the scene 42 captured by the pixels 52 in the subset 58-1, and may have the same shape as that of the pixel mask 48-1. Note that the amount of data in the pixel data set 60-1 may be substantially larger than the amount of data in the pixel data set 28-1 (FIG. 2), due to the larger size of the pixel mask 48-1 relative to the size of the pixel mask 48 illustrated in FIG. 2.

Referring now to the frame period T2, the pixel mask 48-1 is rotated in the counter-clockwise direction 46 with respect to the detector array 16 based on the rotation rate of the scene 42 with respect to the detector array 16. The pixel mask 48-1 identifies a new subset 58-2 of pixels 52. The new subset 58-2 of pixels 52 is a different subset of pixels 52 than the subset 58-1 due to the rotation of the pixel mask 48 with respect to the detector array 16. The subset 58-2 of pixels 52 integrates energy 12 from the scene 42 during an integration period of the frame period T2. Note that due to the dimensions of the pixel mask 48-1, in particular the width of the pixel mask 48-1 in the direction orthogonal to the direction 44, energy 12 emitted from the same portion of the scene 42 that was integrated by certain pixels 52 of the subset 58-1 during the frame period T1, are also integrated by different pixels 52 of the subset 58-2 during the frame period T2.

At the end of the integration period, the subset 58-2 of pixels 52 is readout as a pixel data set 60-2 from the detector array 16. An image portion 62-2 may then be generated based on the pixel data set 60-2. The image portion 62-2 comprises a relatively small slice of the scene 42 captured by the pixels 52 in the subset 58-2.

Referring now to the frame period T3, the pixel mask 48-1 is rotated in the counter-clockwise direction 46 with respect to the detector array 16 based on the rotation rate of the scene 42 with respect to the detector array 16. The pixel mask 48-1 identifies a new subset 58-3 of pixels 52. The new subset 58-3 of pixels 52 is a different subset of pixels 52 than the subsets 58-1, 58-2 due to the rotation of the pixel mask 48-1 with respect to the detector array 16. The subset 58-3 of pixels 52 integrates energy 12 from the scene 42 during an integration period of the frame period T3. At the end of the integration period, the subset 58-3 of pixels 52 is readout as a pixel data set 60-3 from the detector array 16. An image portion 62-3 may then be generated based on the pixel data set 60-3. The image portion 62-3 comprises a relatively small slice of the scene 42 captured by the pixels 52 in the subset 58-3.

The image portions 62-1-62-3 may be continuously combined to form imagery 64 of the scene 42. The process described with respect to frame periods T1-T3 may be repeated continuously, such that the imagery 64 is continually generated and provided, for example, to the display 38 (FIG. 1) and/or the targeting module 40 (FIG. 1). As discussed above, the scanning of the scene 42 with respect to the detector array 16 may occur at a relatively high rate, such as 360 degrees every two seconds, for example. The imagery 64 may thus be continually updated and refreshed every two seconds.

In this embodiment, each subset 58 of pixels 52 captures overlapping portions of the scene 42. Accordingly, the image portions 62-1-62-3 may be combined by integrating the successive image portions 62 such that common portions of the scene 42 captured in successive image portions 62 are combined with one another. The integration of common portions of the scene 42 over different frame periods T1-T3 increases the sensitivity of the imagery 64, and provides full height sensitivity over the entire imagery 64, but at the cost of a higher data rate than that described above with regard to FIG. 2, and de-roll processing during the integration of the successive image portions 62 may still be utilized. However, by utilizing the rolling pixel mask 48-1, the amount of data is greatly reduced compared to reading out the entire detector array 16, and smearing is substantially eliminated.

Figure 5:
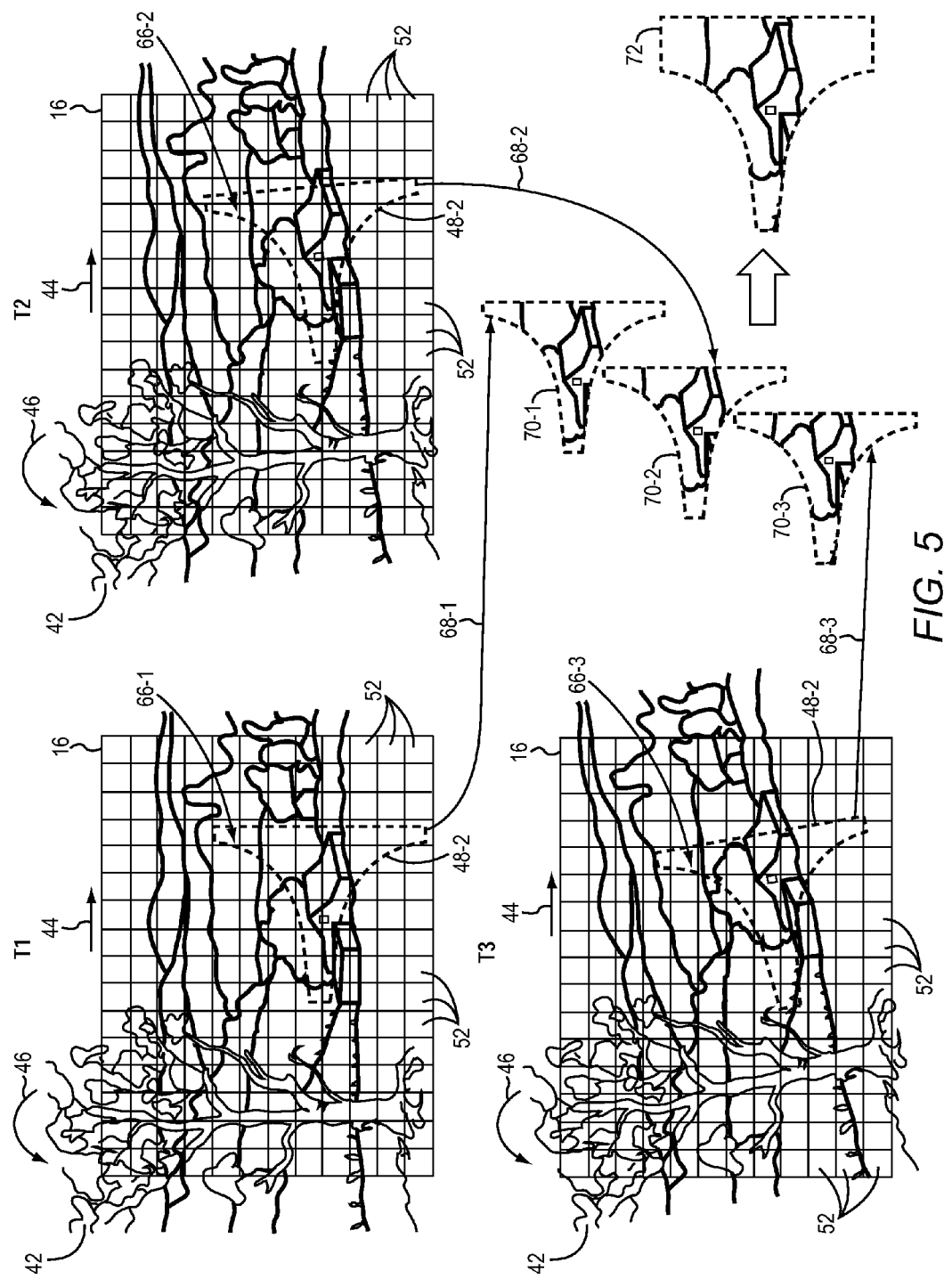
FIG. 5 is a block diagram of the scene at three successive frame periods according to another embodiment.

FIG. 5 is a block diagram of the scene 42 at three successive frame periods T1, T2, and T3 according to another embodiment. In this embodiment, similar to that discussed above with regard to FIG. 4, a pixel mask 48-2 is sized such that energy 12 emitted from the same portion of the scene 42 is successively integrated by multiple subsets of pixels 52 over a plurality of frame periods. As discussed above with regard to FIG. 2, during each frame period T1, T2, T3, the scene 42 is moving translationally, in the direction 44, with respect to the detector array 16, and rotationally, in the counter-clockwise direction 46, with respect to the detector array 16. In this embodiment, the shape of the pixel mask 48-2 is cone- or funnel-shaped, such that roll is completely eliminated. Mechanisms for determining the size and shape of the pixel mask 48-2 will be discussed below.

Referring first to the frame period T1, the pixel mask 48-2 is used to select a subset 66-1 of pixels 52 of the detector array 16. The frame period T1 covers one frame period, and the subset 66-1 of pixels 52 integrates energy 12 from the scene 42 during an integration period of the frame period T1. Again, if the detector array 16 is capable of implementing selective pixel integration, only those pixels 52 in the subset 66-1 may be turned on and integrate energy 12 from the scene 42 during the integration period. Alternatively, all the pixels 52 may be integrating energy 12 from the scene 42 during the integration period.

At the end of the integration period, the subset 66-1 of pixels 52 is readout as a pixel data set 68-1 from the detector array 16. In some embodiments, where the detector array 16 is capable of individual pixel 52 readout, only those pixels 52 in the subset 66-1 are readout. In other embodiments, wherein the detector array 16 is capable of less granular pixel readout, the smallest set of pixels 52 that include the subset 58-1 are readout. An image portion 70-1 may then be generated based on the pixel data set 68-1. The image portion 70-1 comprises a relatively small portion of the scene 42 captured by the pixels 52 in the subset 66-1, and may have the same shape as that of the pixel mask 48-2. Note that the amount of data in the pixel data set 68-1 may be substantially larger than the amount of data in the pixel data set 28-1 (FIG. 2), due to the larger size of the pixel mask 48-2 relative to the size of the pixel mask 48 illustrated in FIG. 2, but may be substantially smaller than the amount of data in the pixel data set 60-1 (FIG. 4), due to the smaller size of the pixel mask 48-2 relative to the size of the pixel mask 48-1 illustrated in FIG. 4.

Referring now to the frame period T2, the pixel mask 48-2 is rotated in the counter-clockwise direction 46 with respect to the detector array 16 based on the rotation rate of the scene 42 with respect to the detector array 16. The pixel mask 48-2 identifies a new subset 66-2 of pixels 52. The new subset 66-2 of pixels 52 is a different subset of pixels 52 than the subset 66-1 due to the rotation of the pixel mask 48 with respect to the detector array 16. The subset 66-2 of pixels 52 integrates energy 12 from the scene 42 during an integration period of the frame period T2. Note that due to the dimensions of the pixel mask 48-2, in particular the width of the pixel mask 48-2 in the direction orthogonal to the direction 44, energy 12 emitted from the same portion of the scene 42 that was integrated by certain pixels 52 of the subset 66-1 during the frame period T1, are also integrated by different pixels 52 of the subset 66-2 during the frame period T2.

At the end of the integration period, the subset 66-2 of pixels 52 is readout as a pixel data set 68-2 from the detector array 16. An image portion 70-2 may then be generated based on the pixel data set 68-2. The image portion 70-2 comprises a relatively small portion of the scene 42 captured by the pixels 52 in the subset 66-2.

Referring now to the frame period T3, the pixel mask 48-2 is rotated in the counter-clockwise direction 46 with respect to the detector array 16 based on the rotation rate of the scene 42 with respect to the detector array 16. The pixel mask 48-2 identifies a new subset 66-3 of pixels 52. The new subset 66-3 of pixels 52 is a different subset of pixels 52 than the subsets 66-1, 66-2 due to the rotation of the pixel mask 48 with respect to the detector array 16. The subset 66-3 of pixels 52 integrates energy 12 from the scene 42 during an integration period of the frame period T3. At the end of the integration period, the subset 66-3 of pixels 52 is readout as a pixel data set 68-3 from the detector array 16. An image portion 70-3 may then be generated based on the pixel data set 68-3. The image portion 70-3 comprises a relatively small portion of the scene 42 captured by the pixels 52 in the subset 66-3.

The image portions 70-1-70-3 may be continuously combined to form imagery 72 of the scene 42. The process described with respect to frame periods T1-T3 may be repeated continuously, such that the imagery 72 is continually generated and provided, for example, to the display 38 (FIG. 1) and/or targeting module 40 (FIG. 1). As discussed above, the scanning of the scene 42 with respect to the detector array 16 may occur at a relatively high rate, such as 360 degrees every two seconds, for example. The imagery 72 may thus be continually updated and refreshed every two seconds.

In this embodiment, each subset 66 of pixels 52 captures overlapping portions of the scene 42. Accordingly, the image portions 70-1-70-3 may be combined by integrating the successive image portions 70 such that common portions of the scene 42 captured in successive image portions 70 are combined with one another. The integration of common portions of the scene 42 over different frame periods T1-T3 increases the sensitivity of the imagery 72, but primarily through a middle portion 74 of the imagery 72, with decreasing sensitivity of the imagery 72 in the directions 76 due to the shape of the pixel mask 48-2. However, a lower data rate is required compared to the embodiments discussed above with regard to FIG. 4, and no de-roll processing is needed. Moreover, by utilizing the rolling pixel mask 48-2, smearing is substantially eliminated.

Generally, as disclosed herein, the shape of the pixel mask 48-2 may differ based on a number of criteria, including a rotation rate of the scene 42 with respect to the detector array 16, the scan rate (i.e., translational movement) of the scene 42 with respect to the detector array 16, a height of the imagery 72, and the like. In one embodiment, the dimensions of the pixel mask 48-2 may be defined in accordance with the following formulas:

Rotation Angle $$= \frac{\text{Scan Rate}\left(\frac{\text{deg}}{\text{sec}}\right)}{\text{Frame Rate (Hz)}} * \left(\frac{\pi}{180}\right) * N \qquad (1)$$

wherein N=a desired number of frames of integration, scan rate is the rate of translational movement, in degrees per second, of the scene 42 with respect to the detector array 16, and that frame rate is the number of frames per second.

A maximum height of the pixel mask 48-2 may be determined either by experiment or arbitrarily, and based on criteria such as desired bandwidth, and the like. The maximum height may be defined in terms of the number of pixels at the widest end of the pixel mask 48-2. The pixel mask 48-2 may be symmetrical about an axis of symmetry that extends perpendicular to the height of the pixel mask 48-2. Rotation blur of a pixel may be expressed in terms of distance of the particular pixel from the axis of symmetry in the following manner:

Rotation Blur

=(distance of pixel from axis of symmetry of the pixel mask 48-2)*Tan(rotation angle) (2)

wherein the distance of the pixel from the axis of symmetry of the pixel mask 48-2 is (pixel number from axis of symmetry*pixel height).

Assuming that it is desired to maintain rotation blur to less than one pixel, the Blur Threshold may be expressed in the following manner:

$$\frac{(\text{rotation blur})}{(\text{pixel size})} < 1 \qquad (3)$$

The pixel mask 48-2 comprises those pixels that are within the blur threshold and within the maximum distance from the axis of symmetry for each of N integration periods. As N goes from 1 to, for example, 50, the conical shape of the pixel mask 48-2 is defined. Thus, in one embodiment, the formula can be expressed in the following manner:

Pixel X is in pixel mask 48-2 if pixel X is ≤maximum distance from axis of symmetry AND pixel X meets a blur threshold of:

((pixel number of pixel X from axis of symmetry)
 *pixel height)*

$$\mathrm{Tan}\left(\frac{\mathrm{Scan\ Rate}\left(\frac{\mathrm{deg}}{\mathrm{sec}}\right)}{\mathrm{Frame\ Rate\ (Hz)}} * \left(\frac{\pi}{180}\right) * (N)\right) \Big/ \mathrm{pixel\ height} < 1 \quad (4)$$

An example of the use of the above formula in generating the pixel mask 48-2 according to one embodiment will be discussed. Assume for purposes of illustration the following:

a desired number of frames of integration, N, is 50;
a desired height of the wide end of the pixel mask 48-2 is 179 pixels, and thus a maximum distance from the axis of symmetry is 89 pixels times the pixel height. In other words, at the widest end of the pixel mask 48-2, 89 pixels will be above the axis of symmetry, and 89 pixels will be below the axis of symmetry;
a scan rate (translational movement) is 180 degrees/second;
a frame rate is 1600 Hz;
pixel size is 0.030 mm by 0.030 mm; and
blur threshold is: rotation blur/1<1.

Beginning with N=1 and pixel number 89, the calculation is:

Blur Threshold=((89*0.030)*

$$\mathrm{Tan}\left(\frac{\frac{180\ \mathrm{deg}}{1\ \mathrm{sec}}}{1600\ \mathrm{Hz}} * \left(\frac{\pi}{180}\right) * (1)\right) \Big/ .030 = 0.1747$$

Because pixel number 89 is within the maximum distance from the axis of symmetry AND 0.1747 is less than 1, pixel number 89 is in the pixel mask 48-2. Because the rotation blur decreases for pixels nearer the axis of symmetry, each of pixel numbers 1-88 will also be within the blur threshold for N=1. Pixel numbers 1-89 on the other side of the axis of symmetry will likewise be within the blur threshold.

Calculating for N=2, and beginning again with pixel number 89, the calculation is:

Blur Threshold=((89*0.030)*

$$\mathrm{Tan}\left(\frac{\frac{180\ \mathrm{deg}}{1\ \mathrm{sec}}}{1600\ \mathrm{Hz}} * \left(\frac{\pi}{180}\right) * (2)\right) \Big/ .030 = 0.3495$$

Because pixel number 89 is within the maximum distance from the axis of symmetry AND 0.3495 is less than 1, pixel number 89 for N=2 is also in the pixel mask 48-2. Because the rotation blur decreases for pixels nearer the axis of symmetry, each of pixel numbers 1-88 will also be within the blur threshold. Pixel numbers 1-89 on the other side of the axis of symmetry will likewise be within the blur threshold.

Table 1 illustrates calculations for pixel numbers 72-89 and for N=1 to N=7 using the above assumptions.

TABLE 1

| 89 | 0.1747 | 0.3495 | 0.5242 | 0.6990 | 0.8737 | 1.0485 | 1.2233 |
|---|---|---|---|---|---|---|---|
| 88 | 0.1727 | 0.3455 | 0.5183 | 0.6911 | 0.8639 | 1.0367 | 1.2095 |
| 87 | 0.1708 | 0.3416 | 0.5124 | 0.683 | 0.8541 | 1.0249 | 1.1958 |
| 86 | 0.1688 | 0.3377 | 0.5065 | 0.6754 | 0.844 | 1.0132 | 1.1820 |
| 85 | 0.1668 | 0.3337 | 0.5006 | 0.6676 | 0.8345 | 1.0014 | 1.1683 |
| 84 | 0.1649 | 0.3298 | 0.4948 | 0.6597 | 0.8246 | 0.9896 | 1.1546 |
| 83 | 0.1629 | 0.3259 | 0.4889 | 0.6518 | 0.8148 | 0.9778 | 1.1408 |
| 82 | 0.1610 | 0.3220 | 0.4830 | 0.6440 | 0.8050 | 0.9660 | 1.1271 |
| 81 | 0.1590 | 0.3180 | 0.4771 | 0.6361 | 0.7952 | 0.9543 | 1.1133 |
| 80 | 0.1570 | 0.3141 | 0.4712 | 0.6283 | 0.7854 | 0.9425 | 1.0996 |
| 79 | 0.1551 | 0.3102 | 0.4653 | 0.6204 | 0.7756 | 0.930 | 1.0858 |
| 78 | 0.1531 | 0.3063 | 0.4594 | 0.6126 | 0.7657 | 0.9189 | 1.0721 |
| 77 | 0.1511 | 0.3023 | 0.4535 | 0.6047 | 0.755 | 0.9071 | 1.0583 |
| 76 | 0.1492 | 0.2984 | 0.4476 | 0.5969 | 0.7461 | 0.8953 | 1.0446 |
| 75 | 0.1472 | 0.2945 | 0.4417 | 0.5890 | 0.7363 | 0.8836 | 1.0309 |
| 74 | 0.1452 | 0.2905 | 0.4359 | 0.5812 | 0.7265 | 0.8718 | 1.0171 |
| 73 | 0.1433 | 0.2866 | 0.4301 | 0.5733 | 0.7166 | 0.8600 | 1.0034 |
| 72 | 0.1413 | 0.2827 | 0.4241 | 0.5654 | 0.7068 | 0.8482 | 0.9896 |

Table 1 illustrates that at the wide end of the pixel mask 48-2, the pixel mask 48-2 is 179 pixels in height (89 pixels on each side of the axis of symmetry, and 1 pixel that defines the axis of symmetry) and is 5 pixels wide. At N=6, the pixel mask 48-2 reduces in height to 84 pixels above and below the axis of symmetry for a single pixel width. At N=7, the pixel mask 48-2 reduces in height to 72 pixels above and below the axis of symmetry. Similar calculations for N=8 to N=50 may be performed to define the overall dimensions of the pixel mask 48-2 using these assumptions.

Figure 6:
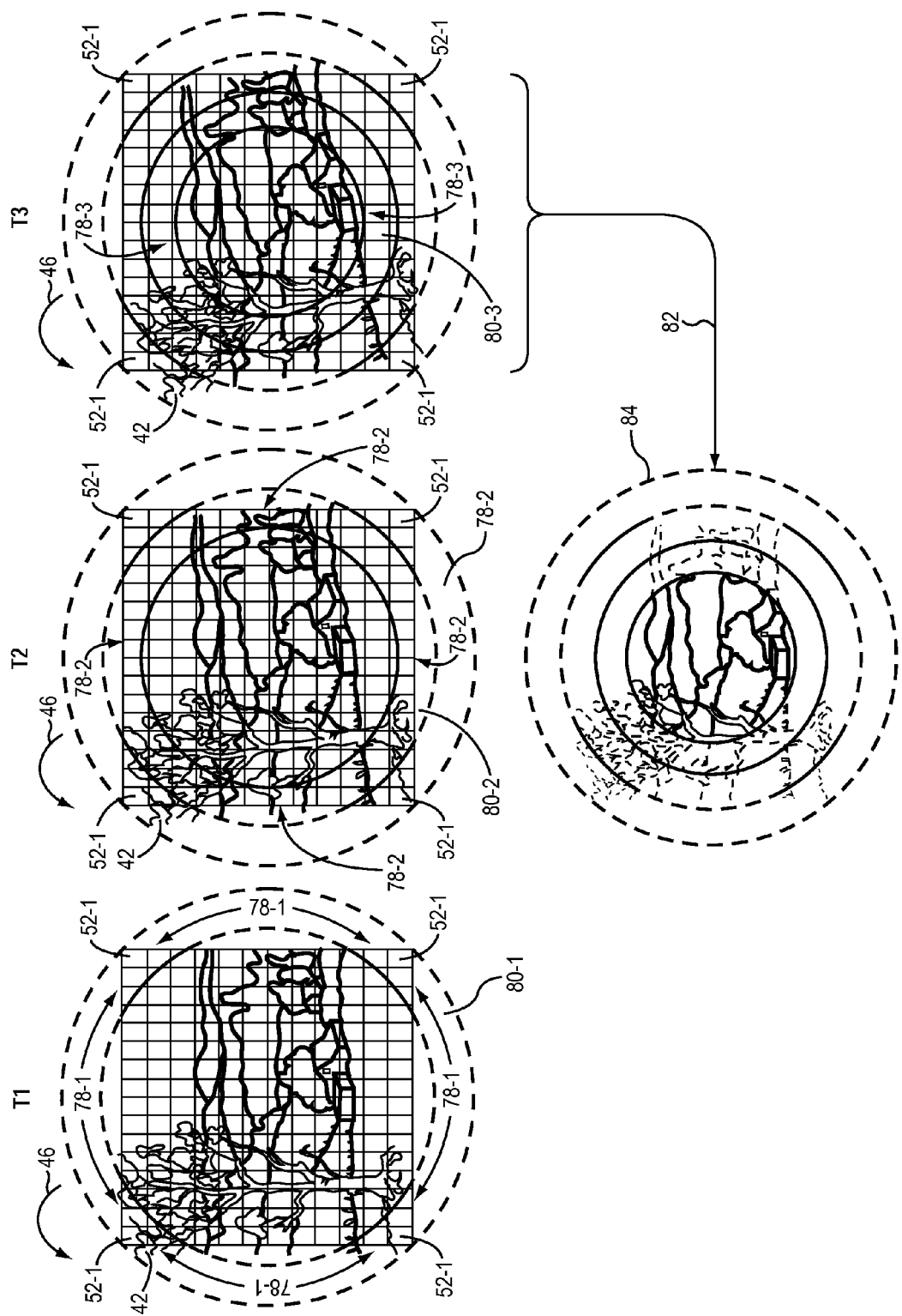
FIG. 6 is a block diagram of the scene at three successive times within the same frame period according to another embodiment.

FIG. 6 is a block diagram the scene 42 at three successive times T1, T2, and T3 within the same frame period according to another embodiment. In this embodiment, the imaging system 10 is operating in a step-stare mode, wherein for each frame a successive portion of the scene 42 is presented to the detector array 16, stopped, and energy 12 of that portion of the scene 42 is integrated by the detector array 16 during the integration period of the respective frame period. Thus, in this embodiment, the scene 42 is not moving translationally with respect to the detector array 16 during the integration period of the detector array 16, but is moving rotationally, in the counter-clockwise direction 46, with respect to the detector array 16. Due to the rotational movement of the scene 42 with respect to the detector array 16, the outermost pixels 52, such as pixels 52-1, smear over a relatively short period of time.

In this embodiment, to eliminate rotational smearing, and based on a blur threshold, annular, ring-shaped pixel masks of continually decreasing radii over the course of the integration period are used to identify successive subsets of pixels 52 to turn off and halt the integration of energy 12 during the integration period. Referring to the first time period T1, assume that integration of energy 12 has been initiated, and all the pixels 52 of the detector array 16 have been integrating energy 12 from the scene 42 for a relatively brief period of time. Based on the rotation rate of the scene 42 with respect to the detector array 16, a subset 78-1 of pixels 52, such as the pixels 52-1, that will smear first are identified based on the blur threshold and a pixel mask 80-1, and integration of energy 12 is halted in each pixel 52 within the pixel mask 80-1. At a time T2, a pixel mask 80-2 is generated based on the blur threshold, and a subset 78-2 of pixels 52 are identified, and integration of the pixels 52 in the subset 78-2 is halted.

At a time T3, a pixel mask 80-3 is generated based on the blur threshold, and a subset 78-3 of the pixels 52 are identified. Integration of the pixels 52 in the subset 78-3 is halted. This process may continue during the integration period successively until the end of the integration period. The pixels 52 of the detector array 16 may then be read out to generate a pixel data set 82. The pixel data set 82 may be used to generate an imagery 84 of the scene 42. The imagery 84 may be generated based on the pixel data set 82. A next successive portion of the scene 42 may be presented to the detector array 16, stopped, and the process repeated. Each pixel mask 80 has an internal radius, external radius, and width that may be determined in accordance with the formulas discussed above with regard to FIG. 5. Essentially, in the context of a step-stare mode, it may be determined whether a pixel 52 is within the blur threshold based on the distance of the pixel 52 from the center of the detector array 16, and the rotational rate of the scene 14 with respect to the detector array 16. For each pixel 52, as the rotational rate of the scene 14 with respect to the detector array 16 displaces the scene 14 more than one pixel 52, integration for that pixel 52 is then halted.

Because different subsets 78 of pixels 52 integrate energy 12 for differing periods of time, the sensitivity of the imagery 84 increases toward the center of the imagery 84.

Figure 7:
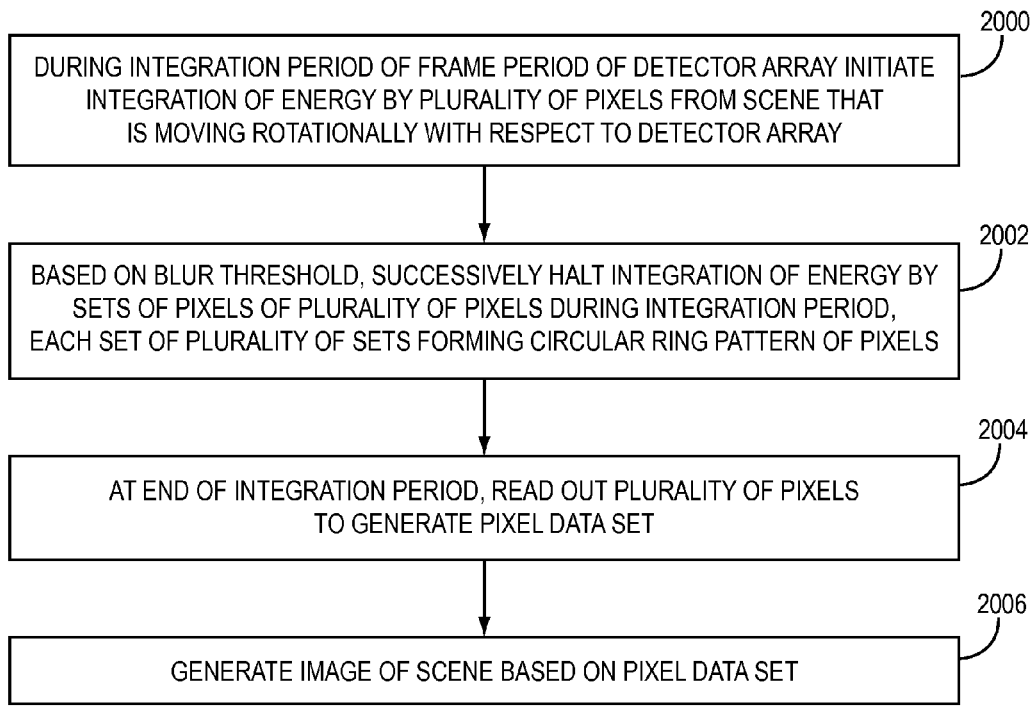
FIG. 7 is a flowchart of a method according to one embodiment.

FIG. 7 is a flowchart of a method according to one embodiment, and will be discussed in conjunction with FIG. 6. The detector array 16 initiates integration of energy 12 by the pixels 52 from the scene 42 (FIG. 7, block 2000). Based on a blur threshold, integration of energy 12 by the subsets 78 of the pixels 52 is successively halted during the integration period (FIG. 7, block 2002). At the end of the integration period, the pixels 52 are read out from the detector array 16 to generate the pixel data set 82 (FIG. 7, block 2004). The imagery 84 is then generated based on the pixel data set 82.

Figure 8:
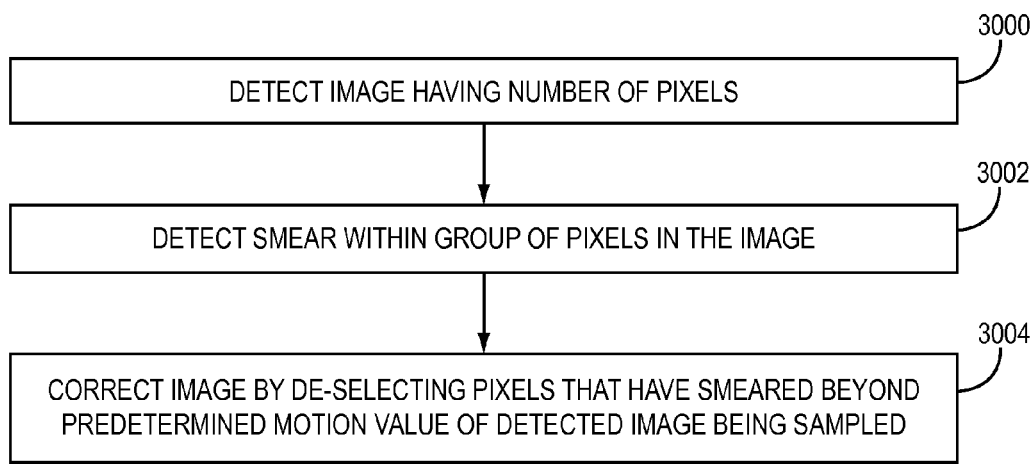
FIG. 8 is a flowchart of a method according to another embodiment.

FIG. 8 is a flowchart of a method according to another embodiment. In this embodiment, an image is detected having a number of pixels (block 3000). The image, for example, may be detected by the detector array 16 from the scene 42. Smear within a subset of pixels 52, such as the subset 78-1, is detected (block 3002). The image is corrected by de-selecting the pixels 52 that have smeared beyond a predetermined motion value of the detected image being sampled (block 3004).

Those skilled in the art will recognize improvements and modifications to the preferred embodiments of the disclosure. All such improvements and modifications are considered within the scope of the concepts disclosed herein and the claims that follow.

What is claimed is:

1. A method, comprising:
for each frame period of a plurality of frame periods of a detector array comprising a plurality of pixels:
rotating a pixel mask with respect to the detector array based on a rotational movement of a scene with respect to the detector array to identify a subset of pixels of the detector array;
integrating, by the pixels in the subset of pixels, energy from the scene; and
reading out the pixels in the subset of pixels to generate a pixel data set;
generating an image portion of the scene based on the pixel data set; and
combining successive image portions to form an image of the scene.

2. The method of claim 1, wherein the pixel mask has a particular shape, and the image portions have the particular shape.

3. The method of claim 1, wherein reading out the pixels in the subset of pixels to generate the pixel data set further comprises reading out less than all the pixels of the detector array.

4. The method of claim 1 wherein combining the successive image portions to form the image of the scene comprises placing the successive image portions side by side to form the image of the scene.

5. The method of claim 1, wherein the pixel mask has a shape of a rectangle, and a width equal to a width of a number of successive pixels shifted in a direction of translational movement of the scene with respect to the detector array each frame period.

6. The method of claim 1, further comprising:
causing a translational movement of the scene with respect to the detector array concurrently with the rotational movement of the scene with respect to the detector array.

7. The method of claim 1, wherein the scene has a translational movement along a first axis at a first rate with respect to the detector array, and the pixel mask has a dimension such that energy emitted from a same portion of the scene is integrated by different pixels in successive subsets of pixels over successive frame periods.

8. The method of claim 7, wherein combining the successive image portions to form the image of the scene comprises integrating the successive image portions such that common portions of the scene captured in the successive image portions are combined with one another.

9. The method of claim 1, wherein the detector array is operating in a time delay and integration mode.

10. A system comprising:
a detector array comprising a plurality of pixels;
a controller configured to:
for each frame period of a plurality of frame periods:
rotate a pixel mask with respect to the detector array based on a rotational movement of a scene with respect to the detector array to identify a subset of pixels of the detector array; and
read out the pixels in the subset of pixels to generate a pixel data set after an integration of energy from the scene by the pixels in the subset of pixels;
generate an image portion of the scene based on the pixel data set; and
combine successive image portions to form an image of the scene.

11. The system of claim 10, wherein the pixel mask has a particular shape, and the image portions have the particular shape.

* * * * *